United States Patent
Law

(10) Patent No.: US 7,401,061 B2
(45) Date of Patent: Jul. 15, 2008

(54) ATTRIBUTE ENGINE

(75) Inventor: Theodore Cheuk-Tak Law, Ridgewood, NJ (US)

(73) Assignee: Lehman Brothers Inc., New York, NY (US)

( * ) Notice: Subject to any disclaimer, the term of this patent is extended or adjusted under 35 U.S.C. 154(b) by 185 days.

(21) Appl. No.: 11/325,220

(22) Filed: Jan. 3, 2006

(65) Prior Publication Data

US 2007/0005546 A1    Jan. 4, 2007

Related U.S. Application Data

(60) Provisional application No. 60/690,659, filed on Jun. 14, 2005.

(51) Int. Cl.
  *G06F 17/00* (2006.01)
  *G06N 5/02* (2006.01)
(52) U.S. Cl. ......................................................... 706/47
(58) Field of Classification Search ........................ None
  See application file for complete search history.

(56) References Cited

U.S. PATENT DOCUMENTS

| | | | | |
|---|---|---|---|---|
| 4,780,960 A | * | 11/1988 | Merz | 33/17 R |
| 4,914,590 A | * | 4/1990 | Loatman et al. | 704/8 |
| 5,043,929 A | * | 8/1991 | Kramer et al. | 703/1 |
| 5,046,109 A | * | 9/1991 | Fujimori et al. | 382/144 |
| 5,113,452 A | * | 5/1992 | Chatani et al. | 382/187 |
| 5,253,189 A | * | 10/1993 | Kramer | 703/7 |
| 5,297,057 A | * | 3/1994 | Kramer et al. | 703/7 |
| 5,315,668 A | * | 5/1994 | O'Hair | 382/159 |
| 5,630,127 A | * | 5/1997 | Moore et al. | 707/103 R |
| 5,796,867 A | * | 8/1998 | Chen et al. | 382/187 |
| 5,917,489 A | * | 6/1999 | Thurlow et al. | 715/809 |
| 6,057,841 A | * | 5/2000 | Thurlow et al. | 715/809 |
| 6,456,239 B1 | * | 9/2002 | Werb et al. | 342/463 |
| 6,598,284 B1 | * | 7/2003 | Chiari et al. | 29/468 |
| 6,606,735 B1 | * | 8/2003 | Richardson et al. | 716/5 |
| 6,691,395 B2 | * | 2/2004 | Chiari et al. | 29/465 |
| 6,741,976 B1 | * | 5/2004 | Tuzhilin | 706/48 |
| 6,747,643 B2 | * | 6/2004 | Happel | 345/419 |
| 7,058,937 B2 | * | 6/2006 | Fu et al. | 717/161 |
| 7,082,602 B2 | * | 7/2006 | Fu et al. | 717/161 |

(Continued)

OTHER PUBLICATIONS

Method for Discovering Actionable Rule Zhu, Heng-min; Huang, Wei-dong; Zheng, Hui-song; Fuzzy Systems and Knowledge Discovery, 2007. FSKD 2007. Fourth International Conference on vol. 1, Aug. 24-27, 2007 pp. 397-401 Digital Object Identifier 10.1109/FSKD.2007.395.*

(Continued)

*Primary Examiner*—Michael B Holmes
(74) *Attorney, Agent, or Firm*—Morgan, Lewis & Bockius LLP

(57) ABSTRACT

An attribute engine matches incoming data against one or more matching attributes to set one or more target attributes of one or more rules. Each rule is characterized by a rule shape and a matchset. A template is defined for each rule shape and target attribute. Templates associated with a target attribute are sorted according to their matchsets and may be suppressed by one or more rule suppression principles. A rules editor is provided that allows support personnel to edit rules in tabular form instead of directly editing pseudo-code segments.

27 Claims, 8 Drawing Sheets

U.S. PATENT DOCUMENTS

| | | | |
|---|---|---|---|
| 7,117,172 B1* | 10/2006 | Black | 705/35 |
| 7,159,125 B2* | 1/2007 | Beadles et al. | 713/193 |
| 7,184,967 B1* | 2/2007 | Mital et al. | 705/8 |
| 7,209,916 B1* | 4/2007 | Seshadri et al. | 707/3 |
| 2004/0059808 A1 | 3/2004 | Galloway et al. | 709/224 |

OTHER PUBLICATIONS

Precise notation for business rules templates Sosunovas, S.; Vasilecas, O.; Databases and Information Systems, 2006 7th International Baltic Conference on Jul. 3-6, 2006 pp. 55-60 Digital Object Identifier 10.1109/DBIS.2006.1678474.*

A transformation definition metamodel for model transformation Jin Liu; Keqing He; Bing Li; Chengwan He; Peng Liang; Information Technology: Coding and Computing, 2005. ITCC 2005. International Conference on vol. 2, Apr. 4-6, 2005 pp. 373-378 vol. 2 Digital Object Identifier 10.1109/ITCC.2005.49.*

Improving Chinese text Chunkings precision using Transformation-based Learning Ying Liu Panpan Liao; Industrial Technology, 2006. ICIT 2006 IEEE International Conference on Dec.15 -17, 2006 pp. 2480-2485 Digital Object Identifier 10.1109/ICIT.2006.372688.*

Loop squashing tranformations for amorphous slicing Lin Hu; Harman, M.; Hierons, R.M.; Binkley, D.; Reverse Engineering, 2004. Proceedings. 11th Working Conference on Nov. 8-12, 2004 pp. 152-160.*

Discovering Neglected Conditions in Software by Mining Dependence Graphs Chang, R.; Podurski, A.; Yang, J.; Software Engineering, IEEE Transactions on : Accepted for future publication vol. PP, Issue 99, 2003 pp. 1-1 Digital Object Identifier 10.1109/TSE.2008.24.*

Hybrid Chinese Text Chunking PanPan Liao; Ying Liu; Lin Chen; Information Reuse and Integration, 2006 IEEE Internatinal Conference on Sep. 2006 pp. 561-566 Digital Object Identifier 10.1109/IRI.2006.252475.*

Application of Semi-Template in Reversible Logic Circuit Wenqian Li; Hanwu Chen; Zhiqiang Li; Computer Supported Cooperative Work in Design, 2007. CSCWD 2007. 11th International Conference on Apr. 26/28, 2007 pp. 332-336 Digital Object Identifier 10.1109/CSCWD.2007.4281457.*

Quantum dot networks with weighted coupling Karahaliloglu, K.; Balkir, S.; Circuits and Systems, 2003. ISCAS '03. Proceedings of the 2003 International Symposium on vol. 4, May 25-28, 2003 pp. IV-896-IV-899 vol. 4 Digital Object Identifier 10.1109/ISCAS.2003.1206365.*

Template design methods for binary cellular neural networks Civalleri, P.P.; Gilli, M.; Cellular Neural Networks and Their Applications, 2000. (CNNA 2000). Proceedings of the 2000 6th IEEE International Workshop on May 23-25, 2000 pp. 247-251 Digital Object Identifier 10.1109/CNNA.2000.876853.*

The template and multiple inheritance approach into attribute grammars Mernik, M.; Lenic, M.; Avdicausevic, E.; Zumer, V.; Computer Languages, 1998. Proceedings. 1998 International Conference on May 14-16, 1998 pp. 102-110 Digital Object Identifier 10.1109/ICCL.1998.674161.*

Top-down knowledge acquisition Neubert, S.; Pirlein, T.; Schmidt, G.; Expert Systems for Development, 1994., Proceedings of International Conference on Mar. 28-31, 1994 pp. 108-113 Digital Object Identifier 10.1109/ICESD.1994.302297.*

* cited by examiner

ATTRIBUTE ENGINE

CROSS-REFERENCE TO RELATED APPLICATIONS

This application claims the benefit of U.S. provisional application Ser. No. 60/690,659, filed Jun. 14, 2005 and is incorporated herein by reference in its entirety.

BACKGROUND OF THE INVENTION

1. Field of the Invention

The present invention relates to systems and methods for efficiently routing and modifying messages based on an input message. More specifically, the invention relates to efficient systems and methods for applying and updating business rules that determine the routing of the sales and trades.

2. Description of the Related Art

At the heart of most automated processing systems is a rules engine that controls a process based on a set of attributes input into the rules engine. Examples of automated processing systems include automated securities trading systems such as those disclosed in U.S. Pat. No. 6,278,982 issued on Aug. 21, 2001 to Korhammer et al. or in U.S. Pat. No. 6,519,574 issued on Feb. 11, 2003 to Wilton et al., both incorporated herein by reference.

Using an automated securities trading system as an illustrative example, a client runs a client program on the client's computer that communicates with a broker/dealer server executing a server counterpart program. The client program sends information to the server according to a predetermined protocol such as, for example, a Financial Information eXchange (FIX) protocol. The information may be formatted as key/value pairs where the key identifies an attribute and the value is the value corresponding to that attribute. An example of an attribute pair is "client=felix" where "client" is the key, or attribute, and "felix" is the value. The incoming attribute pairs are received by the server counterpart program and may be used to set other attributes or control how the server counterpart program processes the session through the use of rules. For example, the automated processing system may contain a rule that states that IF client=felix THEN MaxOrderSize=10,000. Another rule may state that IF client=ernie THEN MaxOrderSize=20,000. In these examples, "client" is referred to as an input attribute and "MaxOrderSize" is referred to as a target attribute.

Each rule allows the automated processing system to provide customized processing of the client's order. As the number of clients increase, however, the number of rules increase and may become a significant portion of the processing time as the rules engine tests each rule in the system.

The availability of pre-packaged generic rules engines such as, for example, ILOG Rules from ILOG, Inc. of Mountain View, Calif. can decrease development costs by providing a complete rules engine module for the automated processing system. The pre-packaged rules engines, however, may trade performance for scope of application. Furthermore, adding/editing rules and viewing their interactions may be difficult in the pre-packaged rules engines.

SUMMARY OF THE INVENTION

An attribute engine matches incoming data against one or more matching attributes to set one or more target attributes of one or more rules. Each rule is characterized by a rule shape and a matchset. A template is defined for each rule shape and target attribute. Templates associated with a target attribute are sorted according to their matchsets and may be suppressed by one or more rule suppression principles. A rules editor is provided that allows support personnel to edit rules in tabular form instead of directly editing pseudo-code segments.

One embodiment of the present invention is directed to a system comprising: a rules table, each row in the rules table representing a rule characterized by a rule shape and having at least one matching attribute and at least one target attribute; and an attribute engine configured to receive input data, examine the rules in the rules table according to a predetermined order, and output a final result set, the final result set representing one or more rules in the rules table that match the input data, wherein the predetermined order is determined by the at least one target attribute and the rule shape.

Another embodiment of the present invention is directed to a method comprising: receiving a target attribute and at least one input key/value pair; retrieving one or more templates associated with the target attribute; sorting the one or more templates according to a matchset of the one or more templates; matching the at least one input key/value pair against the matchset of the one or more templates; and assigning a value to the target attribute, the value determined by the matched matchset of the one or more templates.

BRIEF DESCRIPTION OF THE DRAWINGS

The invention will be described by reference to the preferred and alternative embodiments thereof in conjunction with the drawings in which:

FIG. 6 is a screenshot of the rules editor after addition of a new rule shown in FIG. 5;

FIG. 8 is a screenshot of the rules editor shown in FIG. 7 after the user has entered matching values into the new rule.

DETAILED DESCRIPTION

Figure 1:
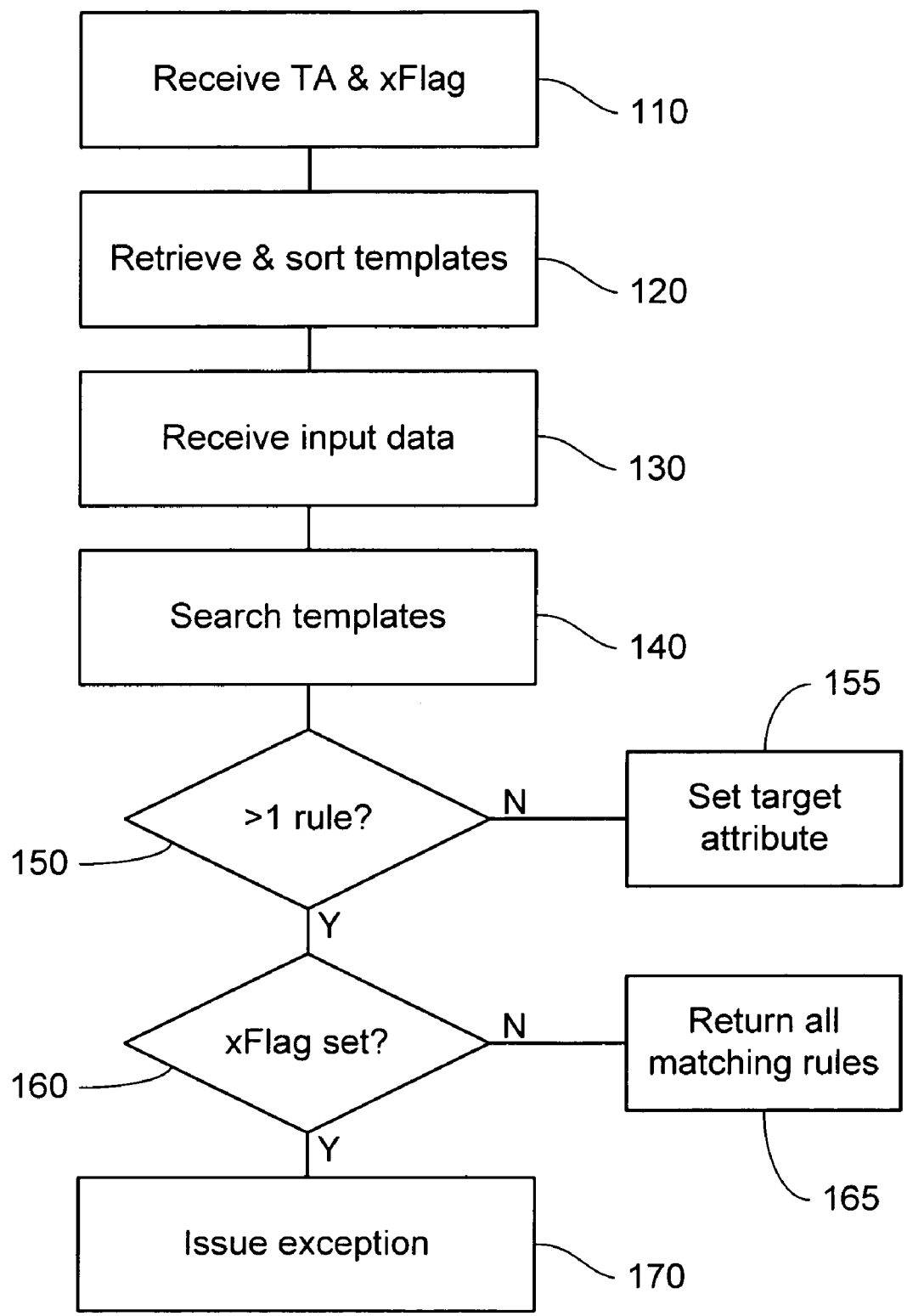
FIG. 1 is a flow diagram illustrating the operation of an embodiment of the present invention.

The description herein should be understood to describe only one preferred embodiment of the invention. Those skilled in the art will recognize, for example, that the described embodiment is just one simplified example of the novel system and method of searching and applying rules in an automated processing system. The simplified example is all that needs to be described in detail in order to enable the more general system and method that the invention comprises.

The description of embodiments of the present invention may be aided with reference to Table 1, which is an exemplar rules table.

TABLE 1

| Rule # | Tmpl. | MA1 | MA2 | MA3 | TA1 |
|---|---|---|---|---|---|
| 1 | 1 | | | | 100 |
| 2 | 2 | NX | | | 10 |
| 3 | 3 | | ERNIE | | 200 |
| 4 | 3 | | FELIX | | 200 |
| 5 | 4 | | FELIX | SCOOTER | 400 |
| 6 | 5 | | FELIX | /SCO.* | 800 |
| 7 | 3 | | ARIEL | | 1000 |
| 8 | 6 | | /CAT.* | /DOG.* | 300 |

In Table 1, the columns labeled "Rule #" and "Tmpl." have been added to aid the description of embodiments of the present invention and are not part of the rules table. The columns labeled "MA1," "MA2," and "MA3" represent matching attributes and the column labeled "TA1" represents a target attribute. Each row in Table 1 represents a rule. The set of matching attributes for which a rule has a non-blank cell are collectively called the matchset of a rule. The values of the matching attributes specify how a rule will match against the incoming data. If all the matching criteria of a rule are satisfied, then it will assign the listed value to the target attribute, subject to rules suppression principles described below. Although Table 1 shows only one target attribute, any number of target attributes may be used in embodiments of the present invention. Similarly, although Table 1 shows three matching attributes, it is understood that embodiments of the present invention are not limited to any specific number of matching attributes.

Each row in Table 1 represents a rule and each cell in Table 1 represents a value. A blank cell in Table 1 means that the corresponding matching attribute is not used in the rule. In other words, the rule does not care about the existence or value of this attribute. Cells containing a value beginning with a forward slash ("/") indicate a Java Regular Expression pattern instead of a literal value. A pattern criteria may be any Java Regular Expression or a numeric comparison such as, for example, ">1000" or ">1000 & <=2000." If the input data matches a regular expression or a numeric comparison, the match is considered a pattern match.

A rule matches when incoming data, preferably in the form of key/value pairs, match the corresponding values for that rule. Using Table 1 as an example, if the incoming data includes "MA2="FELIX" and "MA3=SCOOTER," rules 4, 5, and 6 match the incoming data. Rule 4 matches because the incoming data makes a literal match with the value "FELIX" for matching attribute, MA2. Rule 5 matches because the incoming data literally matches the value "FELIX" for matching attribute MA2 and the value "SCOOTER" for matching attribute MA3. Rule 6 matches because the incoming data makes a literal match with the value "FELIX" for matching attribute, MA2, and makes a pattern match with the pattern SCO.* for matching attribute MA3.

A set of rules suppression principles may be applied to reduce the number of matched rules. In a preferred embodiment, a first rule suppression principle may be used that states that if a matchset of rule A is a strict superset of a matchset of rule B, then rule A suppresses rule B. A matchset of a rule is the set of matching attributes that the rule matches on. Using Table 1 as an example, the matchset of rule 2 is {MA1} and the matchset of rule 5 is {MA2, MA3}. In other words, the first rule suppression principle states that if rule A has a strictly more restrictive matching criteria because it matches on more attributes than that of rule B, then rule A is selected over rule B when both rules match. Using Table 1 as an example, rule 5 suppresses rule 4 because rule 5's matchset of {MA2, MA3} is a strict superset of rule 4's matchset of {MA2} when both rules qualify. If the incoming data includes "MA2="FELIX" and "MA3=SCOOTER," rule 5 suppresses rule 4 since both match the incoming data. If, however, the incoming data includes "MA2=FELIX" but does not include "MA3=SCOOTER," then rule 4 matches the incoming data but rule 5 does not because rule 5 does not match the incoming data.

A second rules suppression principle may be used that states that rule A suppresses rule B, if they both have the same matchset, rule B does not match on a more specific criterion than rule A, and there is at least one matching attribute where rule A matches on a more specific criterion than rule B. When applying the second rules suppression principle, a literal match is a more specific criterion than a pattern match. Referring to Table 1 as an example, rule 6 is suppressed by rule 5 by applying the second rules suppression principle because both have the same matchset of {MA2, MA3}, rule 6 does not match on a more specific criterion than rule 5, and there is at least one matching attribute, MA3, where rule 5 makes a literal match on MA3 and rule 6 makes a pattern match on MA3.

A final set of rules is the set of matching rules that remain unsuppressed after application of the first and second rules suppression principles. If the final set contains a single rule, that rule assigns the target attribute.

As mentioned previously, the rules table may contains thousands of rules that must be tested individually thereby increasing the processing time. The processing time of the rules table may be significantly decreased through the use of a rule shape. A rule shape is the rule matchset with the criterion for matching. Referring to Table 1 as an example, the shape of rule 6 may be described as {MA2=L, MA3=P} where "L" indicates a literal match and "P" indicates a pattern match.

Each rule shape has a corresponding template (Tmpl) that contains information for that rule shape. Each target attribute has a list of Tmpl objects that represent the different rule shapes of all rules that assign to that target attribute. Table 2 below list the templates for the rules shown in Table 1.

TABLE 2

| Tmpl | Rule Shape | Match Set | Literal Match Set | Tmpls. to Suppress | Match Set to Suppress | Rules |
|---|---|---|---|---|---|---|
| 1 | { } | { } | { } | | | 1 |
| 2 | {MA1 = L} | {MA1} | {MA1} | | { } | 2 |
| 3 | {MA2 = L} | {MA2} | {MA2} | | { } | 3, 4, 7 |
| 4 | {MA2 = L, MA3 = L} | {MA2, MA3} | {MA2, MA3} | 5, 6 | {MA2}, { } | 5 |
| 5 | {MA2 = L, MA3 = P} | {MA2, MA3} | {MA2} | 6 | {MA2}, { } | 6 |
| 6 | {MA2 = P, MA3 = P} | {MA2, MA3} | { } | | {MA2}, { } | 8 |

Table 2 lists the six templates associated with TA1 for the rules listed in Table 1. For each template, Table 2 displays the rule shape, match set, literal match set, templates to suppress, match sets to suppress, and the rules associated with the template. The literal match set identifies the matching attributes that have literal matches. The literal match set is a subset of the corresponding match set. In Table 2, templates 4, 5, and 6 have the same match set of {MA1, MA2} but have different literal matches sets.

The column labeled "Tmpls. to Suppress" represents the set of templates with the same match set that are suppressed if the input data matches a rule in the current template. Using Table 2 as an example, if the input data matches rule 6, corresponding to template 5, then template 6 is suppressed. In other words, if the input data matches rule 6, the attribute engine can skip rule 8 because rule 8 belongs to template 6, which is suppressed by template 5. Similarly, if the input data matches rule 5, the attribute engine can skip templates 5 and 6 and the rules associated with templates 5 and 6.

The column labeled "Match Set to Suppress" displays the set of match sets that are suppressed if the input data matches a rule in the current template. Using Table 2 as an example, the match set for template 4 is {MA2, MA3} and will suppress the match sets {MA2} and { } if the input data matches a rule belonging to template 4. The match set, {MA2}, contains template 3 and the match set, { }, contains template 1. Therefore, the attribute engine may skip matchsets containing templates 1 and 3 if the input data matches a rule in template 4.

Each template object includes a bit set representing the templates within the same match set that are suppressed if a rule belonging to the template matches the input data. The template object also includes a pointer to the first template object in the next match set that may be used to quickly skip to the first template of the next match set as soon as all the templates within the current match set have been visited or suppressed. The template object also includes information about the rule shape associated with the template.

FIG. 1 is a flow diagram illustrating the operation of an embodiment of the present invention. At step 110, the attribute engine receives a target attribute and an exception flag from a control program such as, for example, an automated trade processing system. At step 120, the attribute engine retrieves the templates associated with the target attribute received in step 110. The retrieved templates are sorted by the attribute engine. In a preferred embodiment, the retrieved templates are sorted by the size of the template's match set, then by match set so that templates with the same match set are grouped together, then by the number of literal matches in the template. Using the example shown in Table 2, the sorted order of the templates in Table 2 is 4-5-6-2-3-1. In the example, templates 4, 5, and 6 are sorted before templates 2, 3, and 1 because templates 4, 5, and 6 have a larger match set than the match sets of templates 2, 3, and 1. Template 4 is ordered before templates 5 and 6 because template 4 has two literal matches whereas templates 5 and 6 have only one literal match.

The attribute engine receives input data from the control program in step 130. The attribute engine searches through the sorted list of templates and saves every rule that matches the input data in step 140. After the attribute engine has searched every non-suppressed template, the attribute engine determines if there is a single matching rule in step 150. If there is a single matching rule, the attribute engine sets the target attribute to the value corresponding to the target attribute of the single matching rule in step 155. In some embodiments, if there is more than one matching rule, the attribute engine tests if an exception flag, xFlag, is set in step 160. If the exception flag is set, the attribute engine issues an exception to the control program in step 170. If the exception flag is not set, the attribute engine returns all the matching rules to the control program in step 165.

Figure 2:
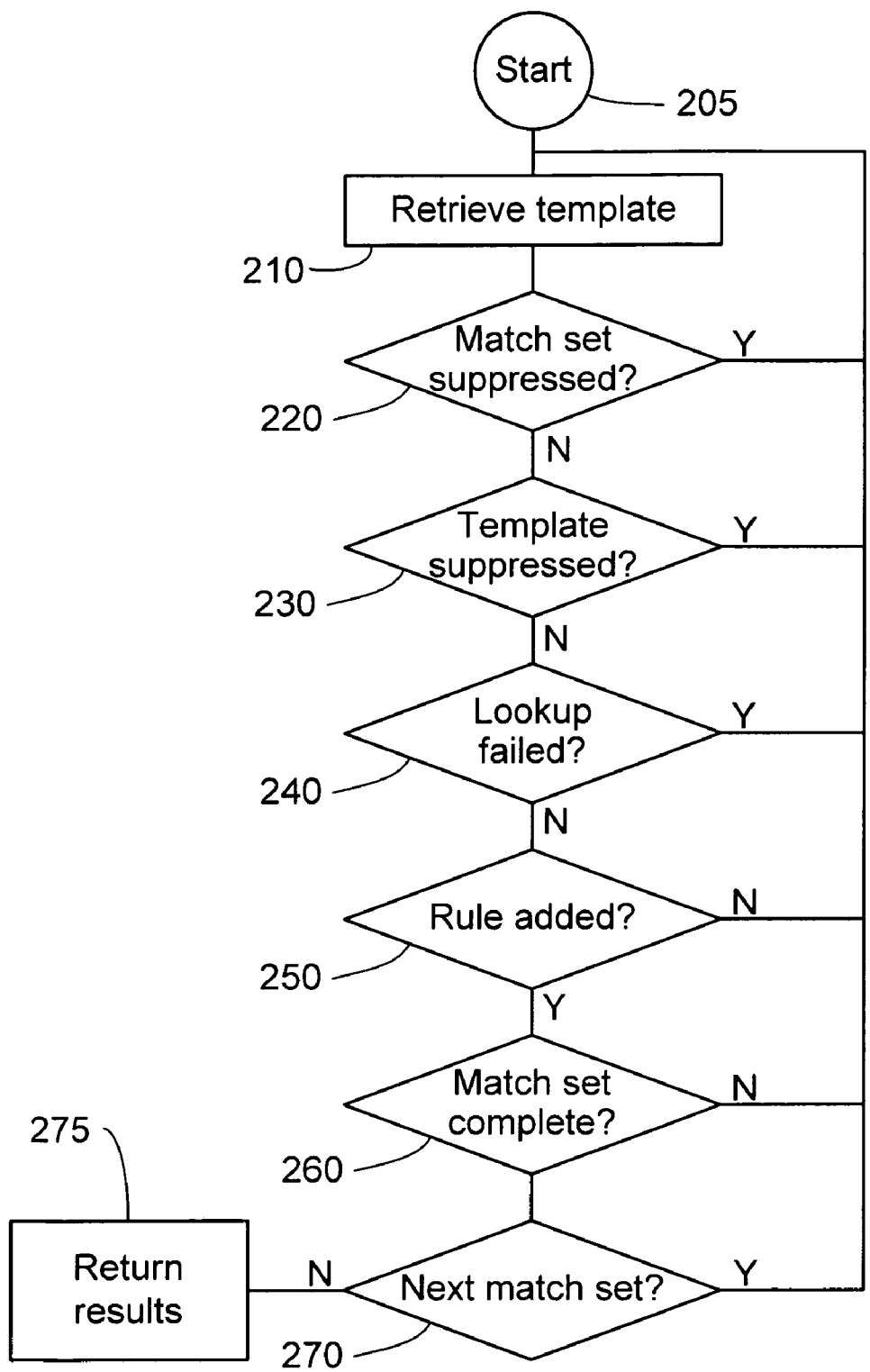
FIG. 2 is a flow diagram illustrating the search operation for the embodiment shown in FIG. 1.

FIG. 2 is a flow diagram illustrating the search operation for the embodiment shown in FIG. 1. After the attribute engine has retrieved and sorted the templates associated with the target attribute, the attribute engine begins a search at 205.

The attribute engine retrieves a template from the sorted list of templates in step 210, starting with the first template in the sorted list.

A determination is made, in step 220, on whether the match set of the current template has been suppressed. If the match set has been suppressed, the attribute engine skips that match set and retrieves the first template of the next match set. If the match set has not been suppressed, a determination is made, in step 230, on whether the current template is suppressed. If the current template is suppressed, the current template is skipped and the next template in the sorted template list is retrieved. If there are no remaining templates in the sorted list, the attribute engine jumps to step 275.

In step 240, a determination is made on whether a rule lookup failed for the current template. If the lookup fails, the current template is skipped and the next template in the sorted template list is retrieved. In step 240, a composite key for the current template is created by concatenating each attribute name in the current template's literal match set and the corresponding value from the input data.

The composite key is used to retrieve a list of rules from a common hash table. The hash table maps from a composite hash key to an array of rule objects. The array is indexed by a target attribute index, which is a small integer that uniquely identifies a target attribute. The inventor has discovered that frequently rules assigning to different target attributes share the same matching criteria. For example, there may be many rules that match on "MA2=FELIX", but assign to different target attributes in the automated processing application. The hash table is preferably shared among all target attributes to eliminate, inter alia, duplicate matching criteria.

In some embodiments of the present invention, the hash table returns a linked list of rule objects whose literal matching criteria match the input data and are associated with the current template. In step 250, each rule in the returned linked list is examined for any additional pattern criteria associated with the rule and if the input data satisfies every pattern criteria associated with the rule, the rule is added to the final result set. If, after examining each rule in the returned linked list, no rule has been added to the final result set, the attribute engine returns to 210 and retrieves the next template from the sorted template list.

If a rule has been added to the final result set, a determination is made in step 260 on whether there are templates in the match set that must be examined. If there are no more templates to examine for the current match set, the attribute engine branches to step 210 to retrieve the first template of the next match set.

In step 260, when a rule is added to the final result set, the attribute engine accumulates a bit set representing all templates within the same match set that should be suppressed. The attribute engine also accumulates a bit set representing all match sets that should be suppressed after all templates in the current match set have been examined. When the accumulated templates equals the set of all templates within the same match set, there are no remaining templates to examine and the attribute engine may skip to the first template in the next match set.

After the attribute engine has determined that there are no remaining templates to examine in the current match set, the attribute engine determines whether there are any remaining match sets in step 270. If all match sets have been examined or suppressed, the attribute engine exits the search module and returns the final result set in step 275. If there are remaining match sets for examination, the attribute engine branches to step 210 and retrieves the first template in the next match set.

Figure 3:
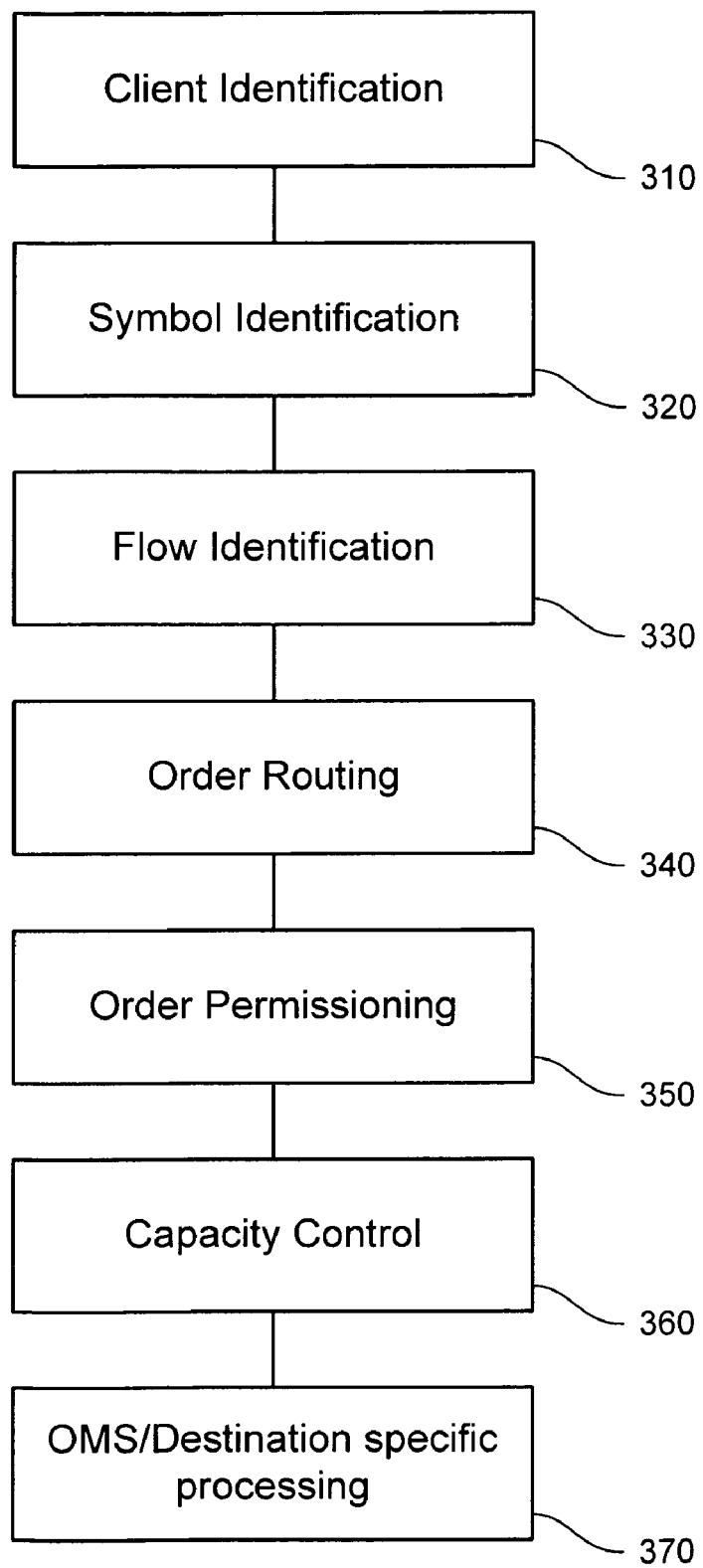
FIG. 3 is a flow diagram illustrating order processing in an embodiment of the present invention.

The attribute engine may be incorporated into automated processing systems to determine and set attributes used by the automated processing system. An example of an automated processing system is an order management system. Another example is a booking system. For illustrative purposes, an automated order processing system for processing equity trades is now described. One of skill in the arts, however, should understand that embodiments of the present invention are not limited to equity trading systems but made be applied to any automated processing system that evaluates one or more rules to determine the processing of an order or job. FIG. 3 is a flow diagram illustrating an automated order processing system for processing equity trades. In step 310, client identification is performed by matching one or more of the incoming key/value pairs to identify the client and set a client ID attribute. For example, depending on the software executing on the client's computer, the client identifier may be in FIX tag 50, SenderSubID, or may be in the tag, OnBehalfOfCompID. In this example, SenderSubID and OnBehalfOfCompID are matching attributes with the client ID the target attribute. The specific equity for the requested trade is identified in step 320. For example, if the exemplar order management system employs the FIX protocol, the attribute engine may match on FIX tag 48, SecurityID, to set the appropriate symbol for the trade.

In step 330, the flow, or method of execution of the order, is determined. Examples of execution methods include DMA, Worked, DTC, and DTM. In DMA, or Direct Market Access, the order is sent to an OMS that is executed rapidly relative to other execution methods. In the Worked method, a typically large order is manually sliced and traded to minimize the effect of the order on the price of the security. In DTC, or Direct to Capital, the order is traded against the investment bank's own portfolio of securities. In Direct To Model, the order may be executed using an automated trading strategy such as, for example, Volume Weighted Average Price (VWAP).

In step 340, the routing of the order to a specific OMS is determined based, in part, by the order flow determined in step 130 and the region of the traded security. In step 350, the order may be rejected if the client is not authorized to make that specific trade. In this example, the client ID, which is a target attribute in step 310 may be used as a matching attribute in step 350.

In step 360, the order may be rejected to protect the downstream systems from a rogue client that, for example, sends 2000 orders in a second. In such a situation, the order is rejected to slow the client down and prevent overloading of the downstream systems. Similarly, an order waiting in a queue beyond a predetermined period most likely indicates a backup in the downstream systems and the order may be rejected to prevent the overload from crashing the system.

In step 370, message information related to the specific OMS is determined. The OMS specific processing may be done in the CCM or at the specific OMS adaptor.

In some embodiments of the present invention, a mechanism is provided to allow manual override or "live" entry of new rules into the automated processing system. In a preferred embodiment, a Graphical User Interface (GUI) may be provided to allow modifications and additions to the rules tables such as the table shown in Table 1. The GUI enables support desk personnel to enter or modify rules in a spreadsheet-type format familiar to many users. The spreadsheet-type format eliminates the need to manually type in an IF-THEN-ELSE rule format and eliminates typographic errors associated with manual entry of an IF-THEN-ELSE rule format. Furthermore, since the attribute engine treats the rule tables as data, recompilation of program code or the database schema is eliminated, thereby enabling "live" updates to the automated processing system. The GUI may be provided to service desk personnel to assist customers in setting up their accounts or customizing changes to their accounts. In order to prevent system-wide errors, the GUI may require that all rule modifications and additions be tied to a specific client.

Figure 4:
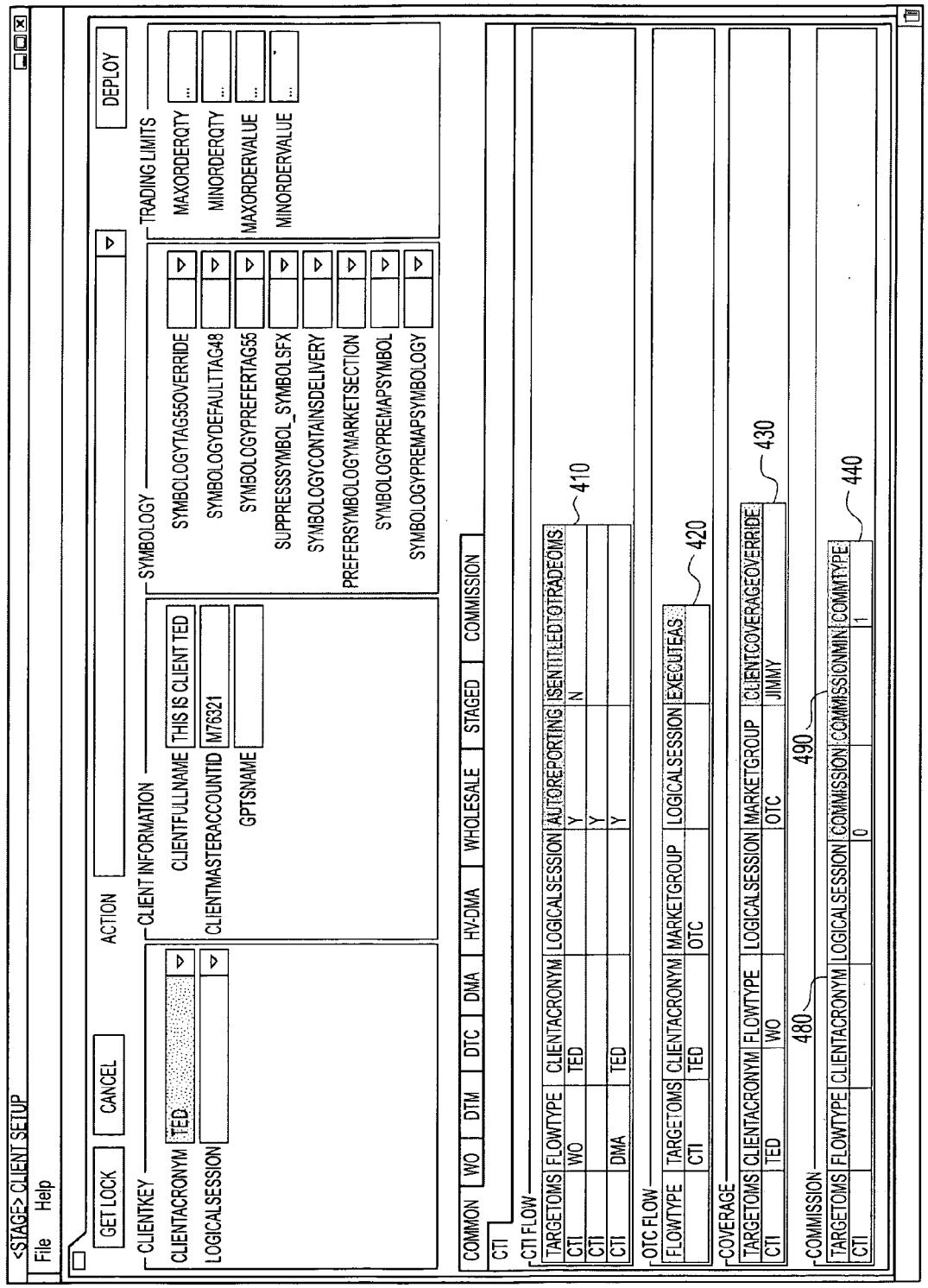
FIG. 4 is a screenshot of a rules editor used in an embodiment of the present invention.

FIG. 4 is a screenshot displaying a setup editor that service desk personnel can use to enter or edit client-specific rules. In FIG. 4, several rules are displayed as separate rules tables 410, 420, 430, and 440. In FIG. 4, column headers identify matching and target attributes for each rules table. A matching attribute header 480 is identified by dark text on a light background and a target attribute header 490 is identified by light text on a dark background. A user may select a rules table to edit by, for example, double clicking on a column header of the table. In a preferred embodiment, a rules editor is displayed in a popup window when the table is selected.

Figure 5:
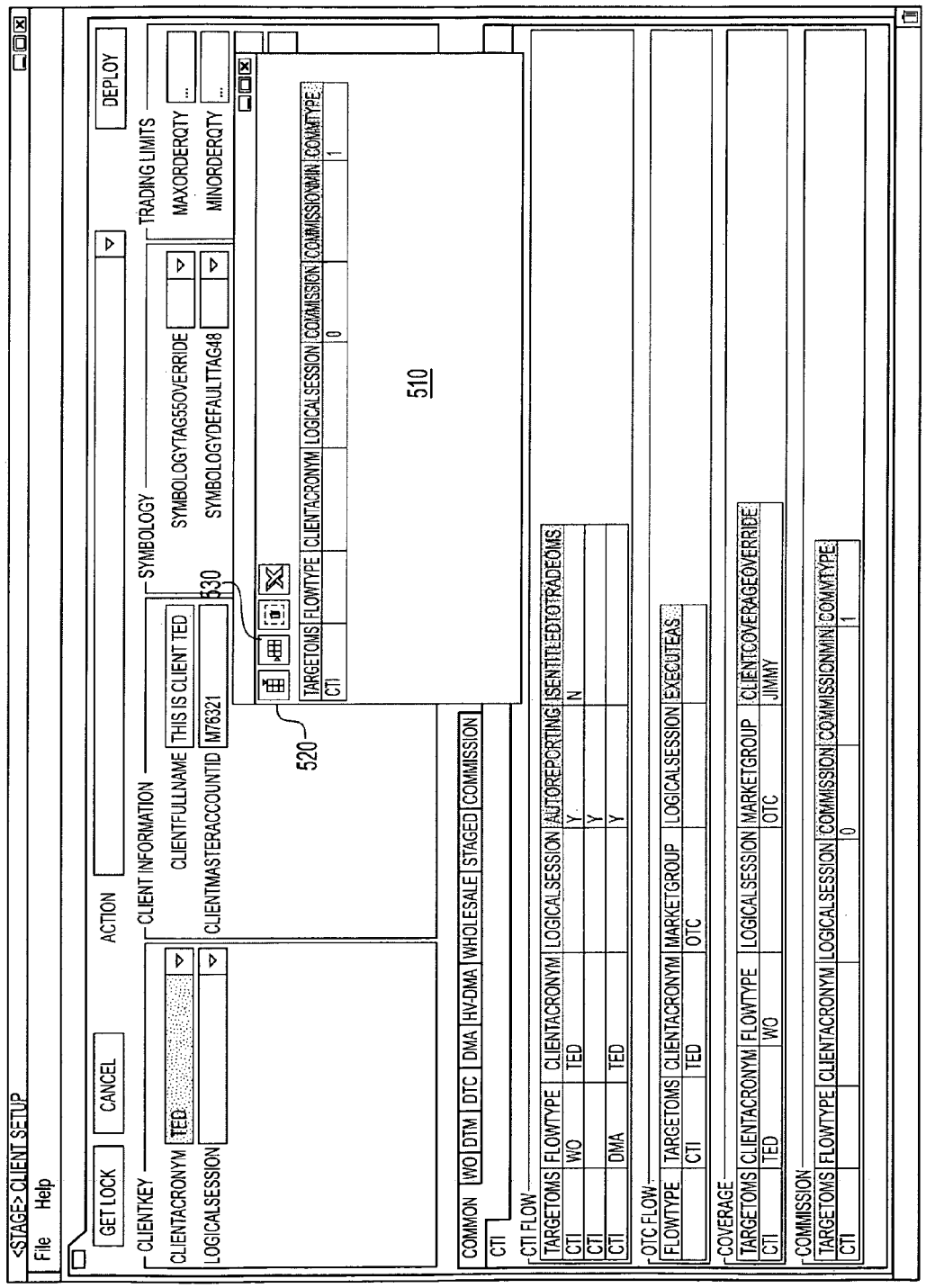
FIG. 5 is a screenshot of a popup window displaying a rules editor 500 used in an embodiment of the present invention

FIG. 5 is a screenshot displaying a rules editor 510 in a popup window in an embodiment of the present invention. The rules editor 510 may be invoked by selecting a rules table by, for example, double clicking on a column of the desired rules table. The rules editor 510 includes a title bar indicating the rules table being edited, a new attribute button 520 for adding a new attribute to the rule, and a new rule button 530 for adding a new rule.

Figure 6:
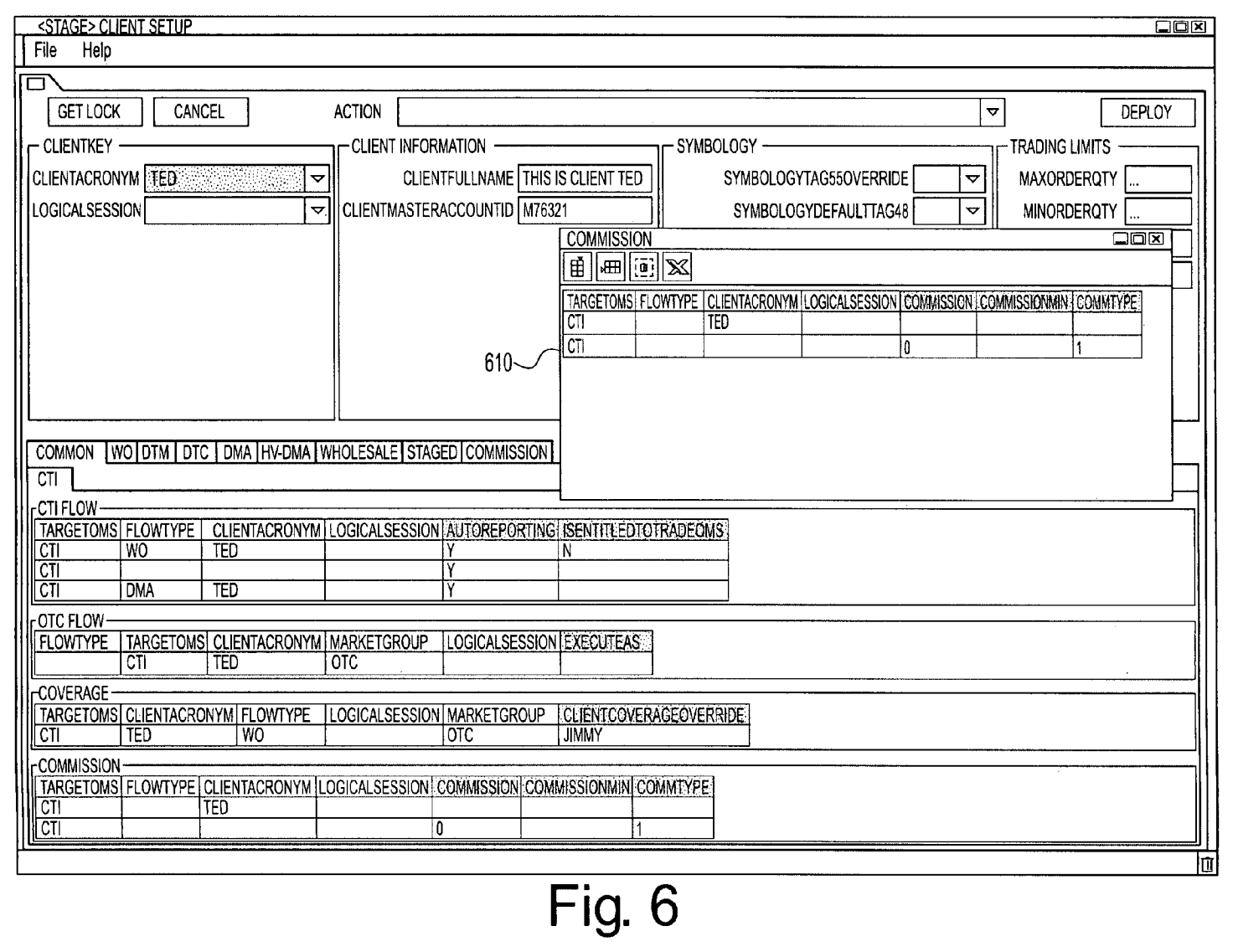
Figure 7:
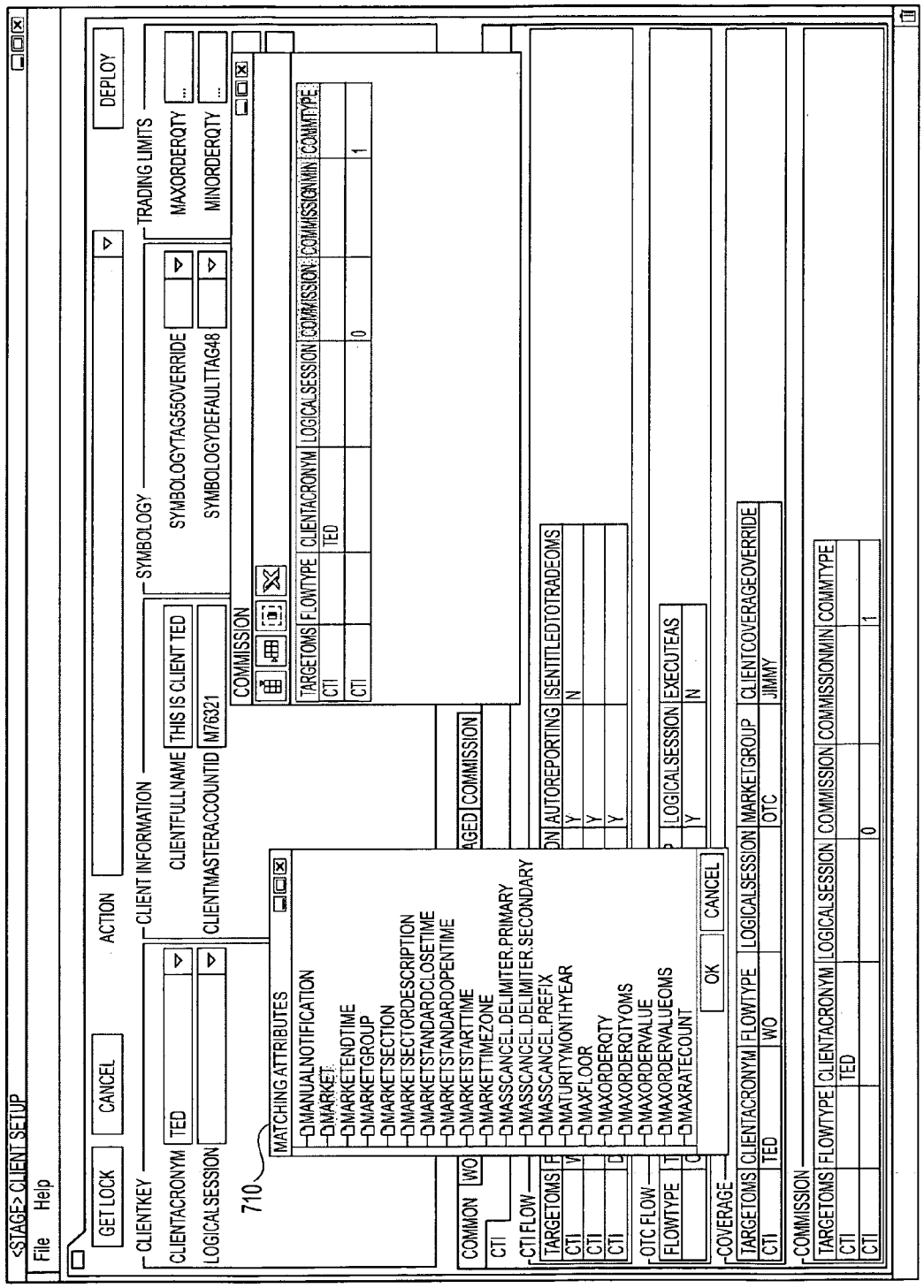
FIG. 7 is a screenshot of the rules editor shown in FIG. 6 displaying a popup window of a list of matching attributes.
Figure 8:
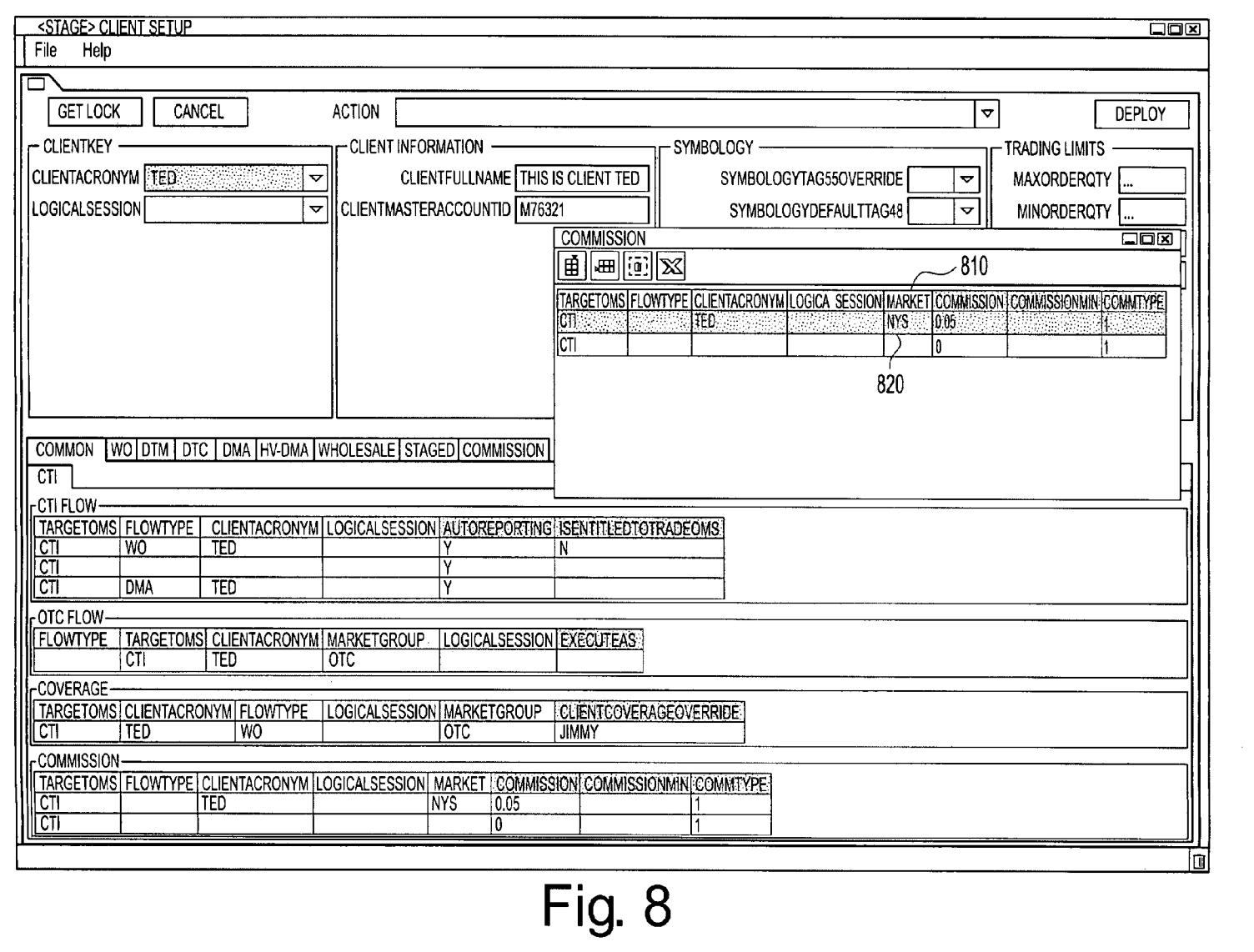

FIG. 6 is a screenshot of the rules editor shown in FIG. 5 after the addition of a new rule. A new rule may be added by clicking on the new rule button 530. The rules editor inserts a new row 610 into the rules table corresponding to the new rule. A new matching attribute may be added to the new rule by clicking on the new attribute button 520. FIG. 7 is a screenshot of the rules editor shown in FIG. 5 after the new attribute button 520 has been clicked. In FIG. 7, a popup window 710 containing a list of attributes is displayed to the user when the user clicks on the new attribute button 520. The user selects one or more attributes and clicks the OK button to add the new attributes to the new rule. FIG. 8 is a screenshot of the rules editor shown in FIG. 5 showing the new matching attribute 810 after the user has entered the desired values into an appropriate cell 820 associated with the new rule.

Embodiments of the present invention comprise computer components and computer-implemented steps that will be apparent to those skilled in the art. For ease of exposition, not every step or element of the present invention is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the present invention.

Having thus described at least illustrative embodiments of the invention, various modifications and improvements will readily occur to those skilled in the art and are intended to be within the scope of the invention. Accordingly, the foregoing description is by way of example only and is not intended as limiting. The invention is limited only as defined in the claims and the equivalents thereto.

What is claimed:

1. A computer-implemented method, comprising:
    retrieving a plurality of rule templates associated with a target attribute, each of one or more of the plurality of rule templates including at least a rule shape and a rule;
    sorting the plurality of retrieved rule templates based on the rule shape of each of one or more of the plurality of rule templates;

receiving incoming data, the incoming data including one or more attributes;

matching the rule of each of one or more of the plurality of rule templates with the one or more attributes based on the sorting of the plurality of retrieved rule templates; and generating a final rule set consisting of matched rules.

2. The method of claim 1, wherein the rule shape includes a match set.

3. The method of claim 2, wherein the match set includes zero or more matching attributes.

4. The method of claim 3 further comprising sorting the plurality of retrieved rule templates based on the one or more matching attributes in the match set.

5. The method of claim 3 further comprising sorting the plurality of retrieved rule templates based on the size of the match set.

6. The method of claim 1 further comprising skipping over a suppressed rule template.

7. The method of claim 1 further comprising determining whether a rule shape has been suppressed, and if that rule shape has been suppressed, then skipping all rule templates associated with the suppressed rule shape.

8. The method of claim 1 further comprising determining whether a rule template from the plurality of sorted rule templates has been suppressed, and if that rule template has been suppressed, then skipping that rule template.

9. The method of claim 6, wherein the skipping is based on whether the rule of each of one or more of the plurality of rule templates matches the one or more attributes.

10. A system, comprising:

a processor;

memory coupled to the processor; and an attribute engine configured by the processor to retrieve from the memory a plurality of rule templates associated with a target attribute, each of one or more of the plurality of rule templates including at least a rule shape and a rule, the attribute engine further configured to sort the plurality of retrieved rule templates based on the rule shape of each of one or more of the plurality of rule templates, to receive incoming data, the incoming data including one or more attributes, to match the rule of each of one or more of the plurality of rule templates with the one or more attributes based on the sorting of the plurality of retrieved rule templates, and to generate a final rule set consisting of matched rules.

11. The system of claim 10, wherein the rule shape includes a match set.

12. The system of claim 11, wherein the match set includes zero or more matching attributes.

13. The system of claim 12, wherein the attribute engine is further configured by the processor to sort the plurality of retrieved rule templates based on the one or more matching attributes in the match set.

14. The system of claim 12, wherein the attribute engine is further configured by the processor to sort the plurality of retrieved rule templates based on the size of the match set.

15. The system of claim 10, wherein the attribute engine is further configured by the processor to skip over a suppressed rule template.

16. The system of claim 10, wherein the attribute engine is further configured by the processor to determine whether a rule shape has been suppressed, and if that rule shape has been suppressed, to skip all rule templates associated with the suppressed rule shape.

17. The system of claim 10, wherein the attribute engine is further configured by the processor to determine whether a rule template from the plurality of sorted rule templates has been suppressed, and if that rule template has been suppressed, to skip that rule template.

18. The system of claim 15, wherein the attribute engine is further configured by the processor to skip based on whether the rule of each of one or more of the plurality of rule templates matches the one or more attributes.

19. A computer program product including a computer readable medium having stored thereon computer executable instructions that, when executed on a computer, configure the computer to perform a method comprising the steps of:

retrieving a plurality of rule templates associated with a target attribute, each of one or more of the plurality of rule templates including at least a rule shape and a rule;

sorting the plurality of retrieved rule templates based on the rule shape of each of one or more of the plurality of rule templates;

receiving incoming data, the incoming data including one or more attributes;

matching the rule of each of one or more of the plurality of rule templates with the one or more attributes based on the sorting of the plurality of retrieved rule templates; and generating a final rule set consisting of matched rules.

20. The computer program product of claim 19, wherein the rule shape includes a match set.

21. The computer program product of claim 20, wherein the match set includes zero or more matching attributes.

22. The computer program product of claim 21 further including computer executable instructions that, when executed by the computer, configure the computer to perform the step of sorting the plurality of retrieved rule templates based on the one or more matching attributes in the match set.

23. The computer program product of claim 21 further including computer executable instructions that, when executed by the computer, configure the computer to perform the step of sorting the plurality of retrieved templates based on the size of the match set.

24. The computer program product of claim 19, further including computer executable instructions that, when executed by the computer, configure the computer to perform the step of skipping over a suppressed rule template.

25. The computer program product of claim 19 further including computer executable instructions that, when executed by the computer, configure the computer to perform the steps of determining whether a rule shape has been suppressed, and if that rule shape has been suppressed, then skipping all rule templates associated with the suppressed rule shape.

26. The computer program product of claim 19 further including computer executable instructions that, when executed by the computer, configure the computer to perform the steps of determining whether a rule template from the plurality of sorted rule templates has been suppressed, and if that rule template has been suppressed, then skipping that rule template.

27. The computer program product of claim 24, further including computer executable instructions that, when executed by the computer, configure the computer to perform the step of skipping based on whether the rule of each of one or more of the plurality of rule templates matches the one or more attributes.

\* \* \* \* \*